(12) United States Patent
Maiwald (10) Patent No.: US 12,479,778 B2
(45) Date of Patent: Nov. 25, 2025

(54) PLANT FOOD TO ENHANCE THE NUTRITIONAL VALUE OF POLLEN AND NECTAR OF PLANTS TO ATTRACT BEES, BUTTERFLIES AND OTHER POLLINATORS

(71) Applicant: Diane Maiwald, New Orleans, LA (US)

(72) Inventor: Diane Maiwald, New Orleans, LA (US)

( * ) Notice: Subject to any disclaimer, the term of this patent is extended or adjusted under 35 U.S.C. 154(b) by 0 days.

(21) Appl. No.: 18/975,237

(22) Filed: Dec. 10, 2024

(65) Prior Publication Data
US 2025/0197307 A1    Jun. 19, 2025

Related U.S. Application Data

(60) Provisional application No. 63/610,826, filed on Dec. 15, 2023.

(51) Int. Cl.
*C05F 11/10* (2006.01)
*C05F 11/02* (2006.01)
*C05G 5/10* (2020.01)

(52) U.S. Cl.
CPC .............. *C05F 11/10* (2013.01); *C05F 11/02* (2013.01); *C05G 5/10* (2020.02)

(58) Field of Classification Search
None
See application file for complete search history.

(56) References Cited

U.S. PATENT DOCUMENTS

| | | | |
|---|---|---|---|
| 4,075,783 | A | 2/1978 | Burden |
| 4,386,107 | A | 5/1983 | Wrignaud |
| 6,120,574 | A | 9/2000 | Moore |
| 8,025,552 | B2 | 9/2011 | Cohen |
| 9,474,776 | B2 | 10/2016 | Stamets |
| 10,667,544 | B2 | 6/2020 | Kunkel |
| 11,350,648 | B2 | 6/2022 | Martinez |
| 11,382,344 | B2 | 7/2022 | Wright |
| 11,471,433 | B1 | 10/2022 | Martinez |
| 11,607,424 | B2 | 3/2023 | Suliman et al. |
| 11,622,975 | B2 | 4/2023 | Chen et al. |
| 11,690,387 | B2 | 7/2023 | Martinez |
| 2006/0063674 | A1 | 3/2006 | Morris |

FOREIGN PATENT DOCUMENTS

| | | |
|---|---|---|
| BE | 1029426 | 12/2022 |
| BE | 1029426 B1 | 12/2022 |
| CN | 112535151 A | 4/2023 |
| EP | 2604112 A1 | 6/2013 |
| EP | 2735229 A1 | 5/2014 |
| EP | 2949220 A1 | 12/2015 |
| WO | 2015020516 A1 | 2/2015 |
| WO | 2016043610 A1 | 3/2016 |
| WO | 2020211234 A1 | 10/2020 |

OTHER PUBLICATIONS

Burger, Hannah et al. "An arthropod deterrent attracts specialised bees to theirhost plants," researchgate.net. Plant-Animal Interactions—Originalpaper, Feb. 1, 2011. https://www.researchgate.net/profile/Hannah-Burger-3/publication/51688112_An_arthropod_deterrent_attracts_specialised_bees_to_their_host_plants/links/5fb2bc6a45851518fdac8ce1/An-arthropod-deterrent-attracts-specialised-bees-to-their-host-plants.pdf.
Nicholls, Elizabeth and Hempel, Natalie. "Plant-Pollinator Interactionsfrom Flower to Landscape: Assessment of pollen rewards by foragingbees," besjournals.onlinelibrary.wiley.com. Functional Ecology 2017, 31, 76-87 https://besjournals.onlinelibrary.wiley.com/doi/pdfdirect/10.1111/1365-2435.12778.
Organocide 3-In-1 Garden Spray (Accessed: Oct. 28, 2023). https://www.domyown.com/organocide-3in1-garden-spray-rts-quart-with-hose-end-attachment-p-20490.html?utm_source=google&utm_medium=organic&utm_campaign=surfaces-across-google&utm_term=20490&srsltid=AfmBOop5nq2ELP4oHX8U3OZAVXimWgF6GjvZsz8RdmqCqj365OBVSjTgyUI.
Humboldt Honey (Accessed: Oct. 28, 2023). https://humboldtnutrients.com/products/humboldt-honey-es.
"Definition of a Mixture," Chemicool Dictionary, available at: www.chemicool.com/definition/mixture.html.
"Compound versus Element," Diffen Compare Anything, available at: www.diffen.com/difference/Compound_vs_Element.
"Definition of Complex," Chemicool Dictionary, available at: www.chemicool.com/definition/complex.html.
Professor Francis Ratnieks and Dr. Nick Balfor; "Bee competitive: Research reveals the impact of natural selection on nectar supply and demand"; ScienceDaily; Aug. 5, 2021; University of Sussex; https://www.scindaily.com/releases/2021/08/g2210805115448.htm.
United States Geological Survey (USGS); "Do bees feed on both nectar and pollen?"; FAQ; Downloaded Oct. 10, 2023; https://ww.usgs.gov/faqs/do-bees-feed-both-nectar-and-pollen?
Hannah Burger, et al.; "An arthropod deterrent attracts specialised bees to their host plants"; Oecologia DOI 10.1007/s00442-011-2136-4; Plant-Animal Interactions-Original Paper; Published online Oct. 2, 2011.
Humboldt Nutrients; Website https://web/archive.org/web/20111229171449/http://www.humboldtnutrients.com/products/humboldt-honey-es/;download Oct. 29, 2023.
Elizabeth Nicholls and Natalie Hempel de Ibarra; "Plant-Pollinator Interactions from Flower to Landscape—Assessment of pollen rewards by foraging bees"; British Ecological Society, School of Life Sciences/University of Sussex and Centre for Research in Animal Behaviour/Psychology-University of Exeter; Functional Ecology 2017, VI 31, pp. 76-87; doi10.1111/1365-2435.12778.
Domyown; "Organocide Bee Safe 3-in-1 Garden Spray with Hose End Attachment"; https://web.archive.org/web/20220120041526/https://www.domyown.com/organocide-3in1-garden-spray-rts-quart-with-hose-end-attachment-p-20490.html; download Oct. 29, 2023.

*Primary Examiner* — Alton N Pryor
(74) *Attorney, Agent, or Firm* — Thomas A. O'Rourke; James Bongiorno; O'Rourke IP Law, PLLC (57) ABSTRACT

A plant food product is configured to be infused through the roots and vascular phloem of the plant, ingested by pollinator insects (e.g., bees) who will pollinate and further the pollinator population, in the natural gardens of the nutritionally supplemented plants. The plant food may be a mixture, complex or compound of lipids/fats, carbohydrates, proteins, minerals, and vitamins, which will increase production thereof in the roots, leaves, flowers, vascular system, and phloem of the plants.

11 Claims, 9 Drawing Sheets

PLANT FOOD TO ENHANCE THE NUTRITIONAL VALUE OF POLLEN AND NECTAR OF PLANTS TO ATTRACT BEES, BUTTERFLIES AND OTHER POLLINATORS

CROSS-REFERENCES

This application claims priority on U.S. Provisional Patent Application Ser. No. 63/610,826, filed on Dec. 15, 2023, the disclosures of which are incorporated herein by reference.

FIELD OF THE INVENTION

The subject matter is a plant food composition that may be applied to the ground, near the roots of potted or inground horticultural plants, or crops or weeds, and may also be applied onto the leaves and/or the blossoms of such plants.

The plant food includes a blend of certain supplements to enhance the nutritional requirements of insect bees and other pollinators. For example, the formula includes a blend of certain fats, carbohydrates, proteins, minerals, and vitamins, which are intended to produce pollen and nectar to nourish any bees, butterflies, or other pollinators that feed on the plant.

Therefore, the bees will feed and pollinate by contacting and ingesting the pollen and nectar of the plant that has been treated with the nutritional plant supplement. The pollen provides protein, lipids, minerals and vitamins, and the nectar provides carbohydrates for the bees.

A preferred example specifies the preferred percentages of the supplements. The ranges of the preferred supplements are discussed below.

BACKGROUND OF THE INVENTION

Efforts have been made to provide food products to be ingested at the hive of the bees. For example, the attached U.S. Pat. No. 11,382,344 of Wright, assigned to APIX Company, describes in detail such a food product for bees which is placed in or near the bee hives for the bees to ingest directly. Wright describes a "pollen substitute composition" which "does not require floral pollen" and which is aggregated in a manufacturing environment as a biscuit mass.

While bees are attracted strongly to plant flowers that are blue, purple, violet, white or yellow, they are also very attracted to plant nectar. Ratnieks and Balfour, "*Bee competitive: Research reveals the impact of natural selection on nectar supply and demand*", University of Sussex, Science-Daily releases 2021/08/210605115448.

Certain flowering plants such as sedum, butterfly bush, marjoram, lavender, and borage produce sufficient nectar to attract bees. Nectar provides bees with energy, carbohydrates, and sugars.

Bees also need sufficient pollen, because it provides protein to the bees. US Geological Survey, "*Do bees feed on both nectar and pollen*? USGS FAQ, 2023. High pollen plants include coreopsis, asters, sunflowers, roses, bee balm, mint, marigold, and yarrow.

Bee hives can be fed, as noted above in Wright '344, with a "pollen substitute composition" which "does not require floral pollen" and which is aggregated in a manufacturing environment as a biscuit mass, for short periods, with this prior art product, but bees must be able to fly remotely to feed on floral, crop or weed plants, to survive long term.

It is noted that the citing of any reference within this disclosure, i.e., any patents, published patent applications, and non-patent literature, is not an admission regarding a determination as to its availability as prior art with respect to the herein disclosed and claimed method/apparatus.

OBJECTS OF THE INVENTION

The present invention approaches the bee population crisis differently, in that it encompasses a plant food product in its current form, to be infused through the roots and vascular phloem of the plant.

Using the herein disclosed supplement, enhanced pollen and nectar of the plant is generated and ingested by the bee or other pollinator in question. The bees or other pollinators will pollinate and further the bee or other pollinator population, in the natural gardens of the supplement enhanced plants.

The present invention provides the categories of nutrients that are necessary for the plant food and enumerates enhanced supplements for the plant food of the present invention.

Applicant's present invention includes a plant food mixture, complex or compound of fats, carbohydrates, proteins, minerals, and vitamins, which will increase production thereof in the roots, leaves, flowers, vascular system, and phloem of the plants. The plant food mixture, complex or compound, is capable of systemic uptake by the plant via liquid spraying on the leaves, by absorption from the plant's growing media from granular, powder or liquid form, as well as by foliar, root and/or trunk injection and/or use of compacted solid spikes.

Applicant's components can also be sized in powder sizes or in the form of other larger particulates, to provide plant systemic uptake to be carried internally through the plant phloem and xylem.

Further objects and advantages of the invention will become apparent from the following description and claims, and from the accompanying drawings.

Definitions

In the context of this application, several terms are utilized as follows.

The definition of a "mixture": a mixture contains 2 or more substances that are not chemically combined to form a compound. Mixtures are unlike chemical compounds, because: the substances in a mixture can be separated using, for example, physical methods such as filtration and distillation. Mixtures have variable compositions while compounds have a fixed definite formula. When mixed, individual substances keep their properties in a mixture, while if they form a compound their properties can change. See chemicool.com.

The definition of "elements" and "compounds": "Elements and compounds are pure chemical substances. The difference between an element and a compound is that an element is a substance made of the same type of atoms, whereas a compound is made of different elements in definite proportions. Examples of elements include iron, copper, zinc, hydrogen and oxygen. Examples of compounds include water ($H_2O$) and salt (sodium chloride-NaCl)." See, diffen.com.

The definition of "complex": "A complex is a molecular entity formed by loose association involving two or more component molecular entities (ionic or uncharged), or the corresponding chemical species. The bonding between the components is normally weaker than in a covalent bond. In inorganic chemistry the term "coordination entity" is recommended instead of "complex" (IUPAC inorganic NOMENCLATURE (1990)." See, chemicool.com.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention approaches the bee population crisis differently, in that it encompasses a plant food product configured to be infused through the roots and vascular phloem of the plant. Unlike additives that are formulated to be used directly in bee populations alone (i.e., by beekeeper's maintaining a bee colony/hive), being specific to only the bee's health, the herein disclosed compositions are also formulated to be safe and beneficial for plants onto which it is applied, i.e., it at least improves the growth of the pollen and nectar of the plants, which is also beneficial for the bees. The plant food also operates to attract bees.

The herein disclosed supplement enhances the pollen and nectar production of the plant, which is then ingested by the bee and/or other pollinators.

Several different compositions may be used for the plant food, each of which may be formulated to improve specific aspects of bee health and even specific bee types (e.g., honeybees, nurse bees—for brooding . . . ) through the application onto the plants, and which are described in greater detail hereinafter. One preferred embodiment for the plant food of the present invention is as follows:

Carbohydrates about 50% by weight
Lipids about 4% by weight
Protein about 46% by weight
Vitamins and minerals less than about 1% by weight.

DETAILED DESCRIPTION OF THE INVENTION

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value or recitation modified by a term such as "about" is not to be limited to the precise theoretical characteristic or value specified, and may include values that differ from the specified value in accordance with design variations that may be described in the specification, as well as applicable case law. Also, in at least some instances, a numerical difference provided by the approximating language may correspond to the precision of an instrument that may be used for measuring the value or characteristic (e.g., a recitation of being "substantially straight"). A numerical difference provided by the approximating language may also correspond to a manufacturing tolerance associated with production of the aspect/feature being quantified/described (see e.g., *Ex Parte Ollmar*, Appeal No. 2014-006128 (PTAB 2016)). Furthermore, a numerical difference provided by the approximating language may also correspond to an overall tolerance for the aspect/feature that may be derived from variations resulting from a stack up (i.e., the sum) of a multiplicity of such individual tolerances.

Similarly, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The preferred embodiments for the plant food of the present invention can be provided either in a mixture, in a compound or in a complex blend, such as known to those skilled in the art of manufacturing plant food. Those of the skill in the art can readily and easily test to determine the doses required of the applicant's invention to increase plant growth.

The preferred embodiment for the plant food of the present invention is as follows:

Carbohydrates about 50% by weight
Lipids about 4% by weight
Protein about 46% by weight
Vitamins and minerals less than about 1% by weight.

This formula is based on the nutritional needs of bees. However, the plant food can be provided in alternate embodiments as follows:

carbohydrates: present preferably at 50%, by weight, may also be provided in the range from about 40% to 60%, by weight,
lipids: present preferably at 4%, by weight, may also be provided in the range from about 2% to 6%, by weight,
proteins with complete amino acids, present preferably at 46%, by weight, may also be provided in the range from 40% to 60%, by weight, and
vitamins and minerals present preferably less than 1%, by weight, may also be provided in the range from less than 1% to 2%, by weight.

Examples of the carbohydrate component include carbohydrates selected from the group consisting of polysaccharides, modified polysaccharides, reducing sugars, monosaccharides, disaccharides, oligosaccharides, arabinose, cellobiose, hexose, gentiobiose, fructose, fucose, galactose, glucose, lactose, mannose, maltose, sorbose, sucrose, rhamnose, ribose, trehalose, gums, carob gum, cycas gum, fenugreek gum, gelatin, gellan gum, guar gum, gum Arabic, gum karaya, gum ghatti, high-acyl gellan gum, Jingan gum, konjac gum, locust bean gum, low-acyl gellan gum, mesquite gum, neem gum, rhamsan, senna gum, tara gum, tragacanth gum, wellan, xanthan gum, mucilage gum, flaxseed mucilage, psyllium gum, yellow mustard mucilage, agar, agarose, agaropectin, alginate, alginic acid salts, carrageenan, k-carrageenan, i-carrageenan, furcellaran, chitin, chitosan, pectin, galacturonans, rhamnogalacturonans, xylogalacturonans, high methyl pectin, low methyl pectin, apple pulp pectin, citrus peel pectin, sugar beet pulp pectin, cellulose, hemicellulose, arabinogalactan, arabinoxylans, beta-glucans, mannans, galactomannans, xyloglucans, glucomannans, microcrystalline cellulose, amylose, amylopectin, algae beta-glucans, yeast beta-glucans, bioemulsans, dextran, curdlan, pullulan, liposan, emulsan, lipid-based carbohydrates, methyl cellulose, ethyl cellulose, ethyl methyl cellulose, hydroxyethyl cellulose, hydroxyethyl methyl cellulose, carboxymethyl cellulose, hydroxypropyl cellulose, hydroxypropyl methyl cellulose, fructans, levan, starches, starches from grains, starches from tuber, almond starch, amaranth starch, banana starch, barley starch, bean starch, carob starch, chia seed starch, chickpea starch, corn starch, modified corn starch, lentil starch, mung bean starch, oat starch, pea starch, quinoa starch, rice starch, rye starch, sorghum starch, soybean starch, sweet potato starch, taro starch, waxy corn starch, waxy rice starch, wheat starch, yeast starch, isolated amylose, isolated amylopectin, chemically modified starch (including, e.g., pre-gelatinized starch, acetylated starch, alkaline-modified starch, bleached starch, cationic starch, methylated starch, ethylated starch, carboxymethylated starch, hydroxypropylated starch, octenyl succinated starch, oxidized starch, phosphate bonded starch), dextrin, cyclodextrin, phosphate distarch phosphate, acetylated distarch phosphate, acetylated distarch adipate, hydroxypropyl distarch glycerol, hydroxypropyl distarch phosphate, acetylated oxidized starch, starch sodium octenyl succinate, fiber, soluble dietary fiber, insoluble dietary fiber, almond fiber, apple fiber, bamboo fiber, banana fiber, barley bran, bean fiber, beet fiber, carrot fiber, chia seed fiber, chicory root, citrus fiber, corn bran, lentil fiber, millet bran, oat fiber, pea fiber, potato fiber, psyllium husk, quinoa fiber, rice bran, rye bran, sweet potato fiber, soy fiber, wheat bran, wood pulp cellulose, inulin, glycoproteins, glycolipids, porous starches, glycolipid structured oils, and arrowroot starch or oats, amaranth, buckwheat, chia, millet, and quinoa or tapioca starch or potato starch or maltodextrin or dextrose, or combinations thereof.

Examples of the protein component are:

pea protein, rice protein, cranberry, sacha inchi, açaí, blackberry, blueberry, broccoli, coconut milk, sunchoke inulin, kale, pomegranate, strawberry, turmeric or dried coconut nectar, dried pineapple, monk fruit, or combinations thereof;

or, fermented yellow pea seed protein, fermented brown rice seed protein, fermented hemp seed, fermented pumpkin, fermented flax seed, fermented mung bean, and fermented spirulina or pea protein, sprouted brown rice protein, amaranth sprout, buckwheat sprout, millet sprout, cracked wall chlorella, quinoa sprout, chia seed sprout, garbanzo bean sprout, lentil sprout, adzuki bean sprout, flax seed sprout, sunflower seed sprout, pumpkin seed sprout, sesame seed sprout or navy beans and almonds or black beans and sweet corn powder, or combinations thereof.

Plant proteins may also be albumins, globulins, prolamins and glutelins, or combinations thereof.

Suitable additional proteins include, for example: gelatin; caseins and caseinates; whey proteins; soy proteins; wheat proteins; corn proteins; rice proteins; barley proteins; egg proteins; muscle proteins; proteins from other legumes and tubers; and combinations thereof.

The lipids of the present invention may be of animal, vegetable or mineral origin, which are substantially water-soluble or water-insoluble, inert, non-toxic hydrocarbon fats and oils and derivatives thereof, and may comprise any of the commonly commercially available fats or oils. The lipid may comprise a vegetable oil base commonly known as hard butter. Hard butters are hydrogenated, press fractionated, or other processed oils that are processed or recombined to have a solid fat index (percent solid fat vs. temperature) similar to that of cocoa butter. However, other lipids may be used. Examples of suitable lipids include tallow, hydrogenated tallow, hydrogenated vegetable oil, almond oil, coconut oil, corn oil, cottonseed oil, light liquid petrolatum, heavy liquid petrolatum, olein, olive oil, palm oil, peanut oil, persic oil, sesame oil, soybean oil or safflower oil. Samples of the lipid/fat component further include:
   medium-chain triglycerides,
   or
   soy phosphoglycolipids, fructose-oligosaccharides, or sunflower lecithin or polyglycerol, esters of fatty acids, mono and diglycerides or palm oil, or combinations thereof.

Samples of vitamins and minerals:
Vitamin A, vitamin C, vitamin D, vitamin E, vitamin K, thiamine, riboflavin, niacin, vitamin B6, folate, vitamin B12, biotin, pantothenic acid, choline, iodine, magnesium, zinc, selenium, copper, manganese, chromium, molybdenum or Vitamin A, vitamin C, vitamin D3, vitamin E, vitamin K, thiamine, riboflavin, niacin, vitamin B6, folic acid, vitamin B12, biotin, pantothenic acid, calcium, iron, phosphorus, iodine, magnesium, zinc, selenium, copper, manganese, chromium, molybdenum, potassium, and choline or Vitamin A, vitamin C, vitamin D3, vitamin E, vitamin K, thiamine, riboflavin, niacin, vitamin B6, folate, vitamin B12, biotin, pantothenic acid, calcium, iodine, magnesium, zinc, selenium, copper, manganese, chromium, molybdenum and boron or Vitamin A, vitamin C, vitamin D3, vitamin E, vitamin K, vitamin K2, Thiamine, riboflavin, niacin, vitamin B6, folate, vitamin B12, biotin, pantothenic acid, choline, calcium, iodine, magnesium, zinc, selenium, copper, manganese, chromium, molybdenum, potassium, boron, myo-inositol, silicon, quercetin, coenzyme Q10, grape seed, or Vitamin A, vitamin C, vitamin D, vitamin E, Thiamine, riboflavin, niacin, vitamin B6, folate, vitamin B12, biotin, pantothenic acid, choline, calcium, magnesium, zinc, selenium, copper, manganese, molybdenum, N-acetyl L-Cysteine, glutathione, boron or combinations thereof.

In one embodiment, the vitamins used in the composition may be particularly selected for enhancing honeybee brood rearing, and may thus include at least B vitamins, vitamin A, vitamin K, as well as Gibberellic acid, Inositol, Pantothenic acid, Riboflavin, nicotinic acid, and pyridoxine. In another embodiment the composition may be particularly selected for nurse bees, and may thus include at least, vitamin A, vitamin K, and B vitamins including thiamine, riboflavin, nicotinamide (niacin, nicotinic acid), pyridoxine, pantothenate, folic acid, and biotin.

The composition of the present invention is designed to be compatible with the physical properties of the carbohydrates, proteins, lipids, vitamins, minerals and any other active ingredients, and the method of application and environmental factors which may include soil type, moisture and temperature, organic matter, soil structure, current nutrient levels and more, which are well known to those in the chemical and agricultural art. The composition does not need to be refrigerated and may preferably be stored at room temperature, preferably being without direct exposure to sunlight, because of the organic nature of the components, and a possibility of them breaking down. A container such as one that is used for storing vitamins is preferred, as it does not allow light in the container, e.g., it does not allow penetration of sunlight.

Therefore, the present invention includes a plant food mixture for providing nutrition to pollinators and in one embodiment the plant food mixture may include:
   at least one component which is a source of carbohydrates in the range of about 40% to about 60% by weight;
   at least one component which is a fat source of lipids in the range of about 2% to about 6% by weight;
   at least one component which is a source of protein with complete amino acids in the range of about 40% to about 60% by weight;
   at least one component which is a source of vitamins and minerals in the range of up to about 2% by weight and more preferably about 1% to up to about 2% by weight; and
   the components being compatible with the physical properties of carbohydrates, vitamins and minerals and any other active ingredients the method of application and environmental factors, which include soil type, moisture and temperature, organic matter, soil structure and current nutrient levels. The composition of the present invention may be applied directly to the plants or to the ground around the plants by itself or as combined with one of more fillers.

Any of the plant food mixtures disclosed herein may preferably include a one or more polyphenols either alone or part of a blend such as a Polyphenol Whole Food Blend. The Polyphenol Whole Food Blend may include at least two of the following, and may more preferably include each of the following and which may be in equal proportions: Apple fruit powder, Blueberry fruit powder, Blackberry fruit powder, Peach fruit powder, Apricot fruit powder, Raspberry fruit powder, Cranberry fruit powder, Strawberry fruit powder, European Elder fruit powder, Barberry Fruit Powder, (Sour) Cherry fruit powder, Green Tea Lead Extract, (Organic) Broccoli Head Plant powder, (Organic) Spinach Leaf Powder, Collards Leaf Powder, (Organic) Pumpkin Seed powder, (Organic) Sweet Potato Root powder, (Organic) Sunflower Seed Powder, Organic Kelp Powder, (Organic) Chlorella Cracked Cell Wall powder, (Organic) Maitake Mushroom Fruiting Body powder, and (Organic) Shitake Mushroom powder.

The preferred carbohydrates of the plant food mixture thereof can be provided in components in which the carbohydrates component is arrowroot starch or one selected from the group consisting of oats, amaranth, buckwheat, chia, millet, and/or can be selected from the group consisting of quinoa, tapioca starch, potato starch, maltodextrin and dextrose, or combinations thereof.

The preferred fat sources of the plant food mixture can be provided in components in which the fat source component is medium-chain triglycerides or one selected from the group consisting of soy phosphoglycolipids, fructose-oligosaccharides, or sunflower lecithin or polyglycerol, esters of fatty acids, mono and diglycerides, or palm oil, or combinations thereof.

The preferred protein components of the plant food mixture can be provided in components in which the protein component is selected from the group consisting of pea protein, rice protein, cranberry, sacha inchi, acai, blackberry, blueberry, broccoli, coconut milk, sunchoke inulin, pomegranate, strawberry, turmeric or dried coconut nectar, dried pineapple, monk fruit, fermented yellow pea seed protein, fermented brown rice seed protein, fermented hemp seed, fermented pumpkin, fermented flax seed, fermented mung bean, fermented spirulina or pea protein, sprouted brown rice protein, amaranth sprout, buckwheat sprout, millet sprout, cracked wall chlorella, quinoa sprout, chia seed sprout, garbanzo bean sprout, lentil sprout, aszuki bean sprout, flax seed sprout, sunflower seed sprout, pumpkin seed sprout, sesame seed sprout, navy beans, almonds, black beans and sweet corn powder, or combinations thereof.

Additionally, the preferred plant proteins of the plant food mixture may also be provided in which the plant protein may also be selected from the group consisting of albumins, globulins, prolamins and glutelins, or combinations thereof.

The sources of vitamins and minerals of the plant food mixture may be provided in which sources of vitamins and minerals are selected from the group consisting of vitamin A, vitamin C, vitamin D, vitamin E, vitamin K, thiamine, riboflavin, niacin, vitamin B6, folate, vitamin B12, biotin, pantothenic acid, choline, iodine, magnesium, zinc, selenium, copper, manganese, chromium, molybdenum, vitamin D3, calcium, iron, phosphorus, boron, myo-inositol, silicon, quercetin, coenzyme Q10, grape seed, N-acetyl L-cysteine, glutathione and/or boron, or combinations thereof.

A most preferred embodiment of the plant food may include the following components in percent by weight, with the milligram amounts being for one serving of the plant food usable for treating one-square foot of soil beneath a plant:

| Component | Amount per Serving | Percent by Weight |
|---|---|---|
| Vitamin A (as Retinyl Palmitate) | 225 mcg | .03 |
| Vitamin C (Ascorbic Acid) | 90 mg | 12.6 |
| Vitamin D (as Cholecalciferol) | 10 mcg | .001 |
| Vitamin E (as D-Alpha Tocopheryl Succinate) | 15 mg | 2.1 |
| Vitamin K (as Phytonadione) | 30 mcg | .004 |
| Thiamin (as Thiamin HCl) | 10 mg | 1.4 |
| Riboflavin (as Riboflavin-5-Phosphate Sodium) | 10 mg | 1.4 |
| Niacin (as Niacinamide) | 20 mg | 2.8 |
| Vitamin B6 (as Pyridoxal-5 Phosphate) | 20 mg | 2.8 |
| Folate (as L-5-Methyltetrahydrofolate Calcium) | 400 mcg | .06 |
| Vitamin B12 (as Methylcobalamin) | 250 mcg | .03 |
| Biotin | 300 mcg | .04 |
| Pantothenic Acid (as Calcium-D-Pantothenate) | 15 mg | 2.1 |
| Choline (as Choline Bitartrate) | 50 mg | 7.0 |
| Iodine (a Potassium Iodide) | 100 mcg | .01 |
| Magnesium (as magnesium bisglycinate oxalate buffered, magnesium bisglycinate chelate, magnesium oxide) | 20 mg | 2.8 |
| Zinc (as Zinc Bisglycinate Chelate) | 7.5 mg | 1.0 |
| Selenium (as L-Selenium) | 30 mcg | .004 |
| Copper (as Copper Bisglycinate Chelate) | 1.0 mg | .14 |
| Manganese (as Manganese Bisglycinate Chelate) | 0.50 mg | .07 |
| Chromium (as Chromium Nicotinate Glycinate Chelate) | 35 mcg | .005 |
| Molybdenum (as Molybdenum Glycinate Chelate) | 100 mcg | .01 |
| Gotu Kola Herb Extract | 125 mg | .17 |
| Bacopa Leaf Extract | 100 mg | 14 |
| Pycnogenol Maritime Pine Bark Extract | 50 mg | 7.0 |
| BioPerine Black Pepper Fruit Extract | 5.0 mg | .70 |
| Polyphenol Whole Food Blend, including: Apple fruit powder, Blueberry fruit powder, Blackberry fruit powder, Peach fruit powder, Apricot fruit powder, Raspberry fruit powder, Cranberry fruit powder, Strawberry fruit powder, European Elder fruit powder, Barberry Fruit Powder, (Sour) Cherry fruit powder, Green Tea Lead Extract, (Organic) Broccoli Head Plant powder, (Organic) Spinach Leaf Powder, Collards Leaf Powder, (Organic) Pumpkin Seed powder, (Organic) Sweet Potato Root powder, (Organic) Sunflower Seed Powder, Organic Kelp Powder, (Organic) Chlorella Cracked Cell Wall powder, (Organic) Maitake Mushroom Fruiting Body powder, and (Organic) Shitake Mushroom powder. | 175 mg | 25 |

Note that in the above list of components parentheses are used to indicate optionality, e.g., "organic" (i.e., grown without pesticides) appears in parentheses because those components may be organically grown or may be non-organic, but the organically grown components are more preferred. The Vitamins and Minerals may also include one or more of the following or blends thereof Vitamin E - D-alpha tocopheryl acetate, D-alpha tocopheryl succinate Vitamin K - phylloquinone, phytonadione Thiamin - thiamine hydrochloride, thiamine mononitrate Riboflavin -Riboflavin 5'-Phosphate, Riboflavin 5'-Phosphate Sodium Niacin - Niacin, Niacinamide, Vitamin B6 - pyridoxine, pyridoxal-5 phosphate Folate- folic acid, L-methylfolate, 5-Methyltetrahydrofolic acid Vitamin B-12- Methylcobalamin, Cyanocobalamin, Adenosyl Cobalamin and Hydroxy Cobalamin Pentothenic Acid - Pentothenic acid, calcium d pantothenate Choline - Choline bitartrate, Phosphatidyl Choline Iodine - Potassium iodide Magnesium - Magnesium citrate, magnesium glycinate, magnesium bisglycinate, magnesium oxide, magnesium bisglycinate chelate, magnesium bisglycinate chelate buffered Zinc - Zinc Glycinate, Zinc Bisglycinate, Zinc Picolinate, Zinc Bisglycinate Chelate Selenium - Selenomethionine, L-Selenomethionine, selenite Copper - Copper glycinate, Copper bisglycinate, copper bisglycinate chelate Manganese - Manganese glycinate, Manganese bisglycinate, Manganese bisglycinate chelate Molybdenum - Molybdenum glycinate, Molybdenum bisglycinate, Molybdenum bisglycinate chelate Chromium - Chromium glycinate, Chromium bisglycinate, Chromium bisglycinate chelate, Chromium nicotinate glycinate chelate The aforementioned plant food mixture is adapted to be infused through the roots and vascular phloem of a selected plant, whereby the supplement enhances pollen and nectar production of the selected plant. This pollen and/or nectar is ingested by a bee or other pollinator insect that will pollinate and further result in more pollinator population in the natural gardens of the plants, thereby enhancing the population of bees, butterflies and other insect pollinators.

Figure 1:
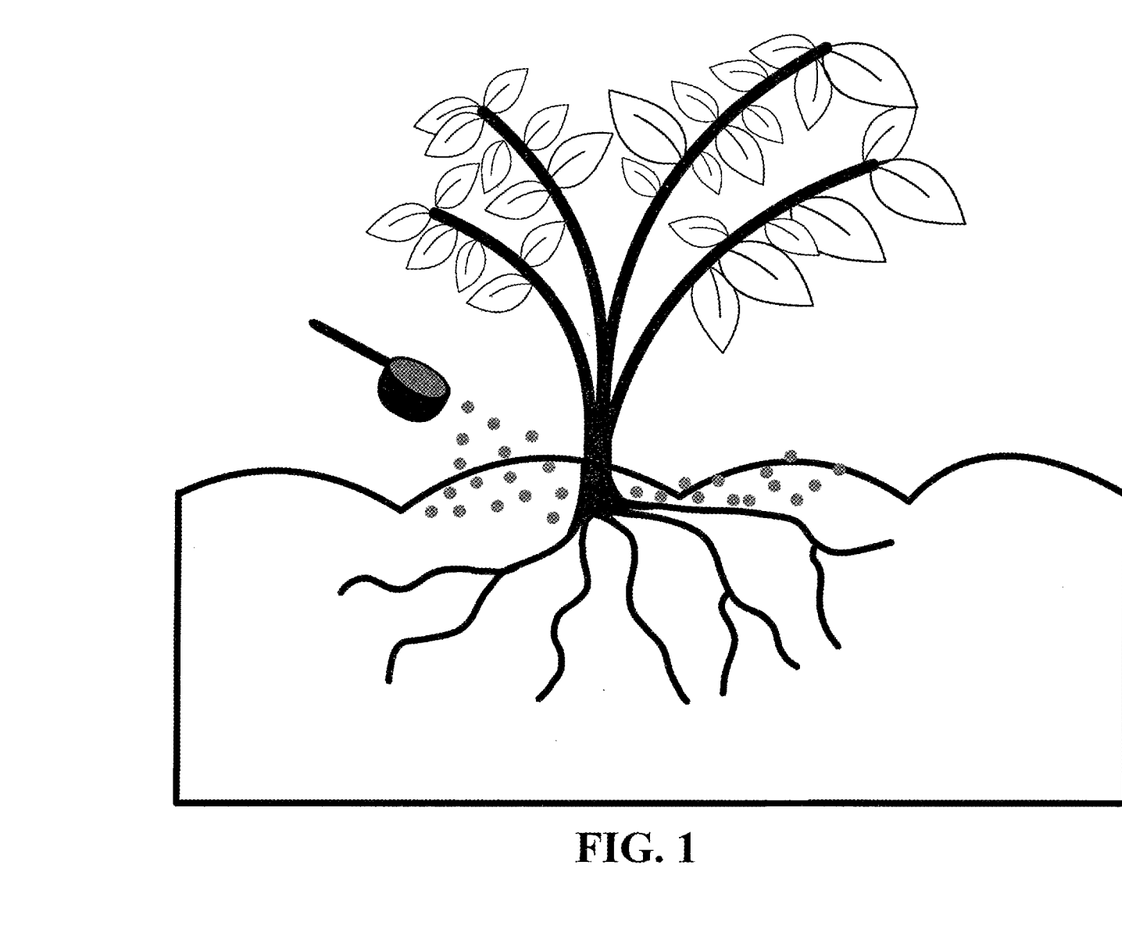
FIG. 1 is perspective view showing application of the plant food as disclosed herein, on top of the underlying soil into which the plant is planted.
Figure 2:
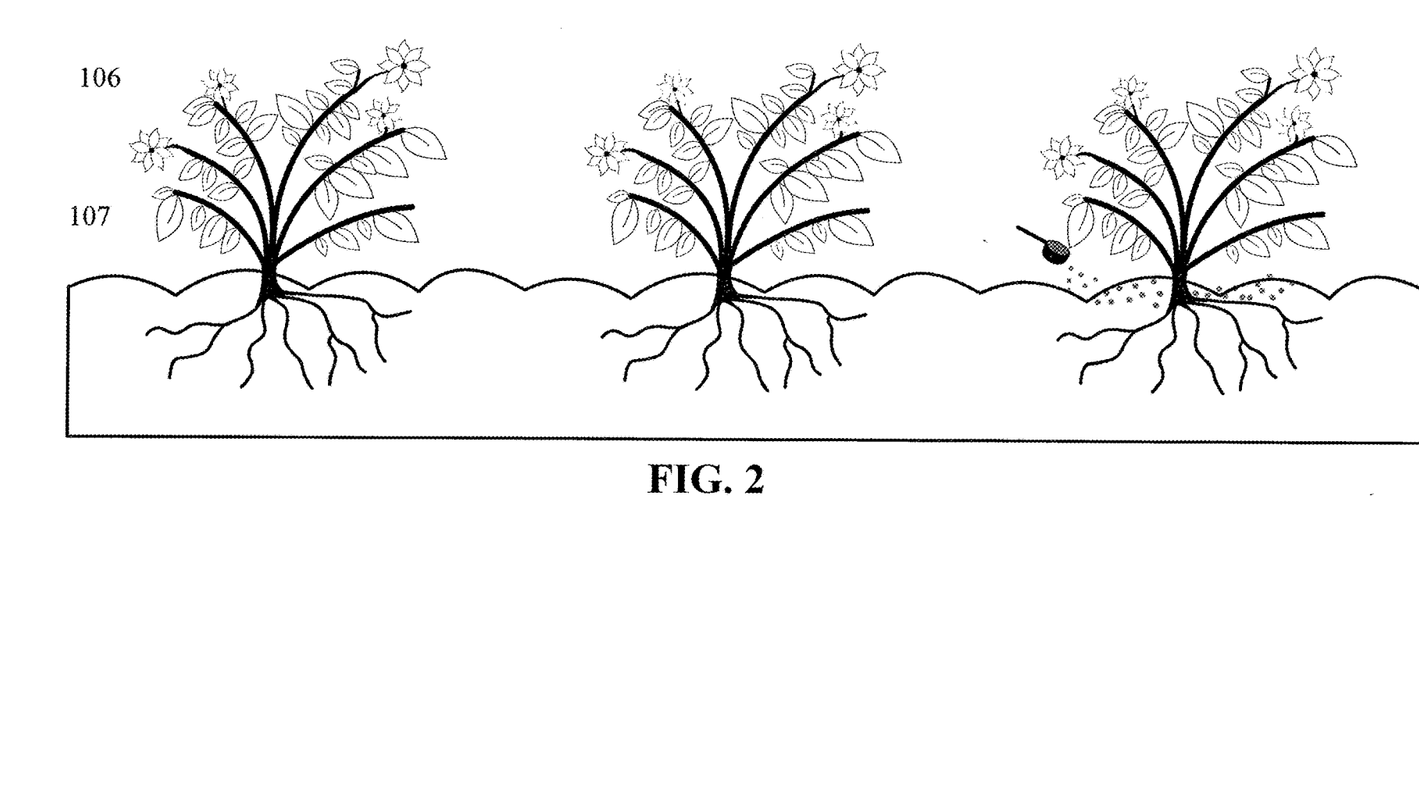
FIG. 2 is a view showing a row of flowering plants, onto one of which is applied the plant food composition disclosed herein.
Figure 5:
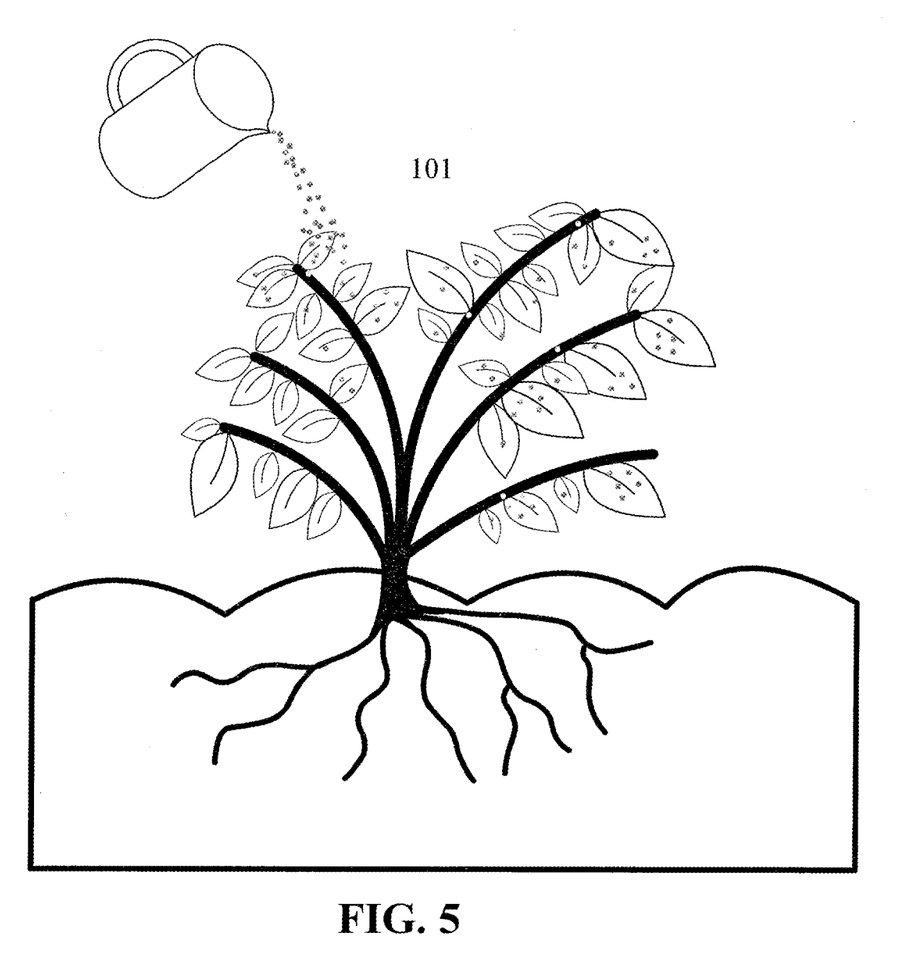
FIG. 5 is perspective view showing application of the plant food as disclosed herein, being poured onto the leaves of a plant, when in a liquid form.
Figure 6:
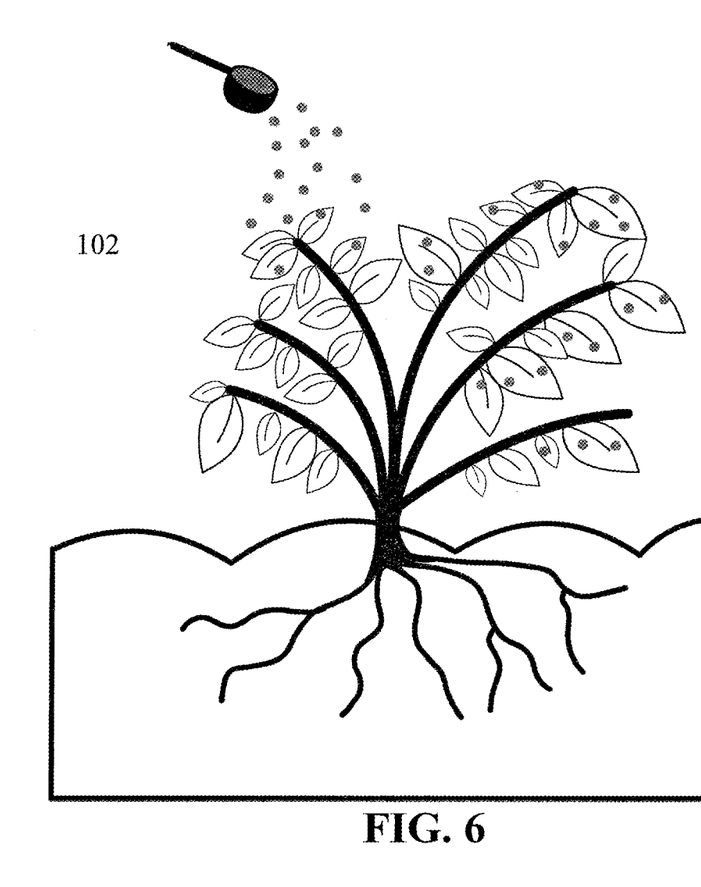
FIG. 6 is perspective view showing application of the plant food as disclosed herein, onto the leaves of a plant in a powder or particulate form.
Figure 7:
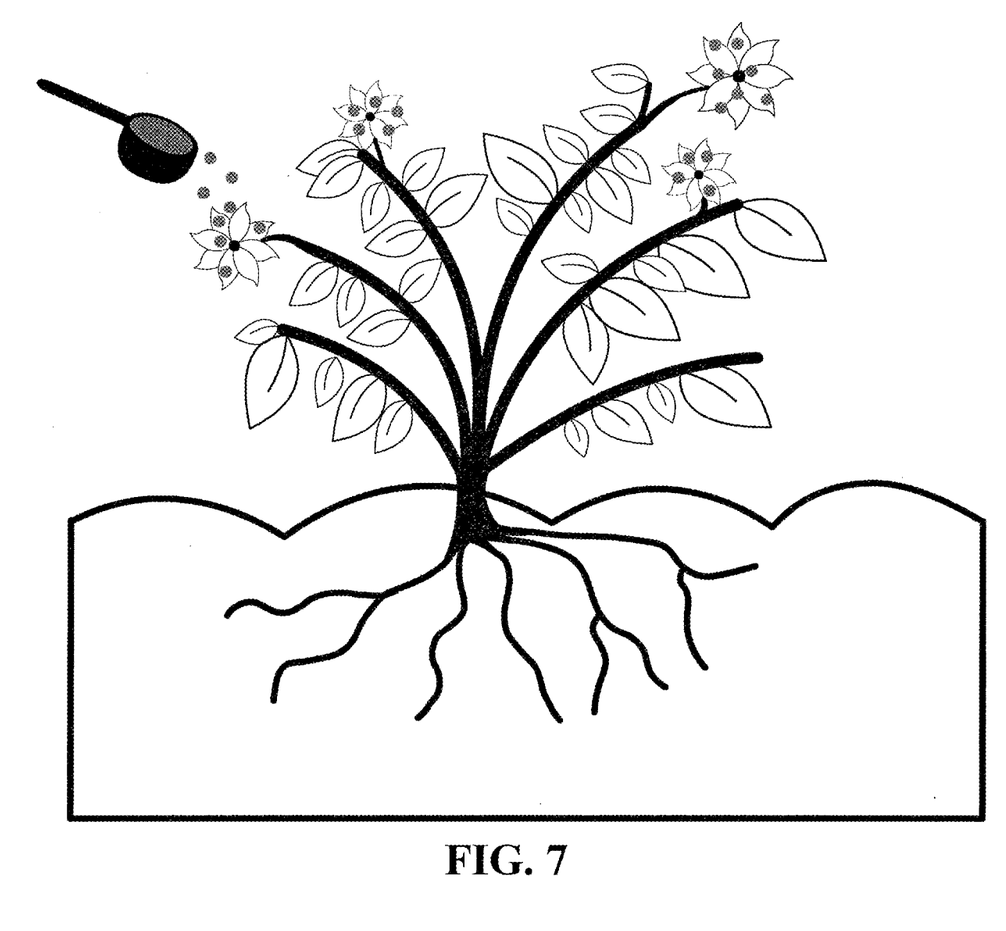
FIG. 7 is perspective view showing application of the plant food as disclosed herein, onto only the blooms (i.e., the flower or blossom) of a plant.
Figure 8:
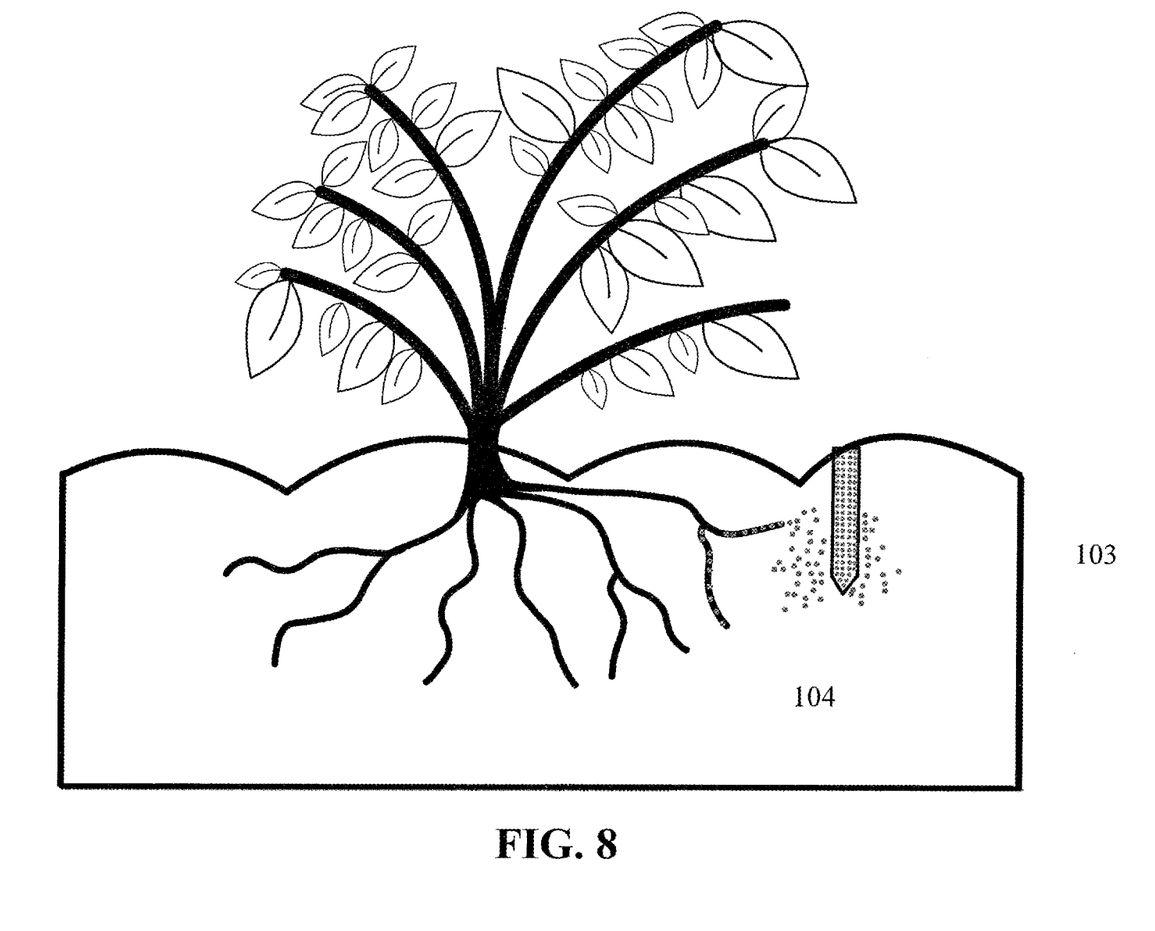
FIG. 8 is perspective view showing application of the plant food as disclosed herein, through the underlying soil into which the plant is planted when in a plant spike form.
Figure 9:
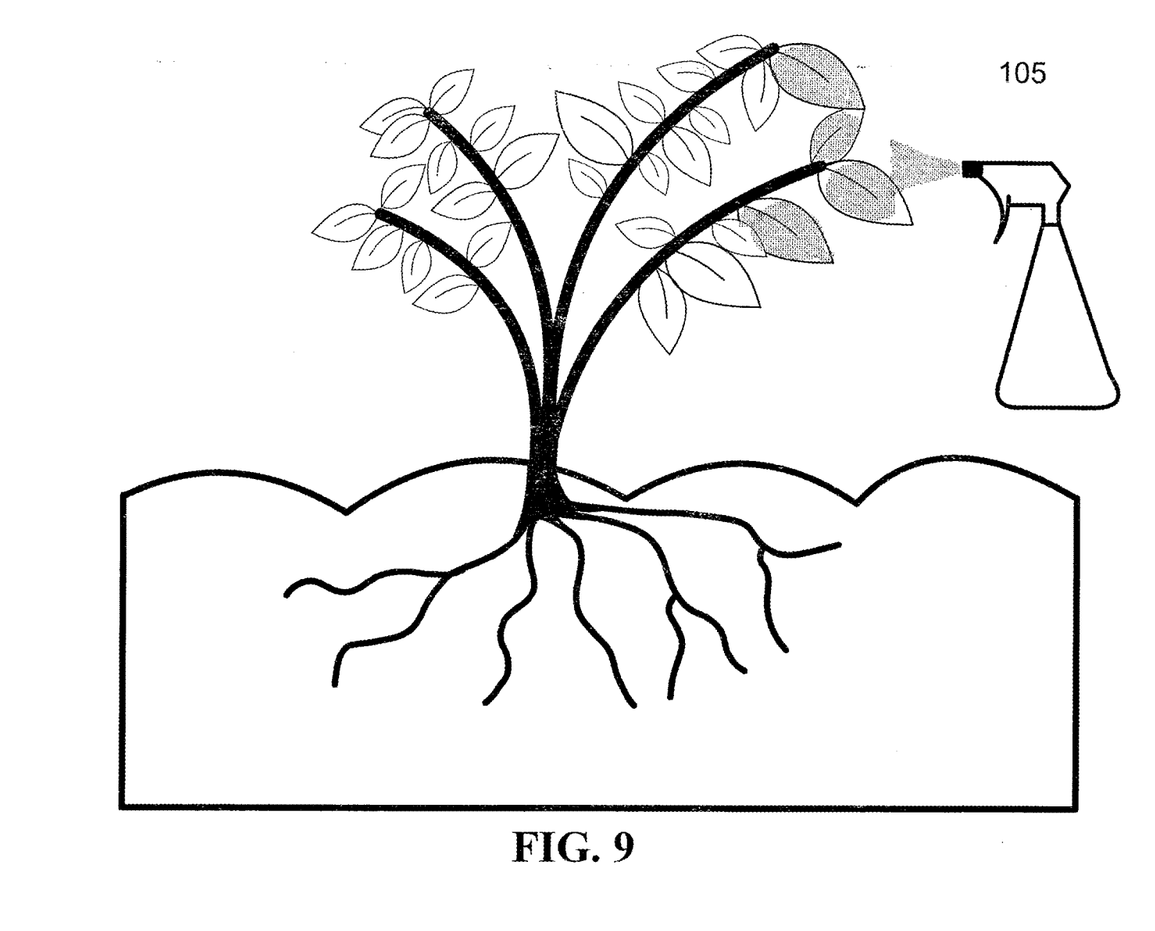
FIG. 9 is perspective view showing application of the plant food as disclosed herein, being sprayed onto the leaves of a plant using a spray bottle.

The present invention also provides a method of enhancing the effectiveness of a pollinator population comprising the steps of:

applying a plant food mixture capable of systemic uptake by a plant where the application of the plant food mixture is capable of systemic uptake by the plant via the following:

by liquid spraying as seen in FIG. 9, by absorption of the plant's growing media 106/107, from granular 102, powder 101, or liquid form 105, as seen in FIGS. 5-6 and 9, as well as by foliar, root and/or trunk injection, and/or use of compacted solid spikes 103 (FIG. 8), or on the ground near the roots of potted or inground horticultural plants as seen in FIGS. 1-2.

The preferred embodiment of the present invention is a powder mixture. The ingredients may be purchased in powder form and manually mixed to create a relatively equal dispersion. The current mixing method consists of combing the ingredients in a large bag, sealing the bag, and shaking the mixture for roughly ten minutes. The preferred method of application for said powder is as follows; one tablespoon of powder per square foot of the plant's surface area is to be applied to the soil surrounding the roots of the plant, the plant may then be watered until the powder is no longer visible. Although the soil upon which the plant food is deposited does not per se need to be watered immediately, it is nonetheless beneficial because ants and other bugs/animals could discover the plant food, and eat the formula because it is organic, which may prevent the plant food from being received into the soil, and thus it would benefit the bugs/animals and not benefit the plant(s). The plant food should be applied every two weeks for ideal results.

Figure 3:
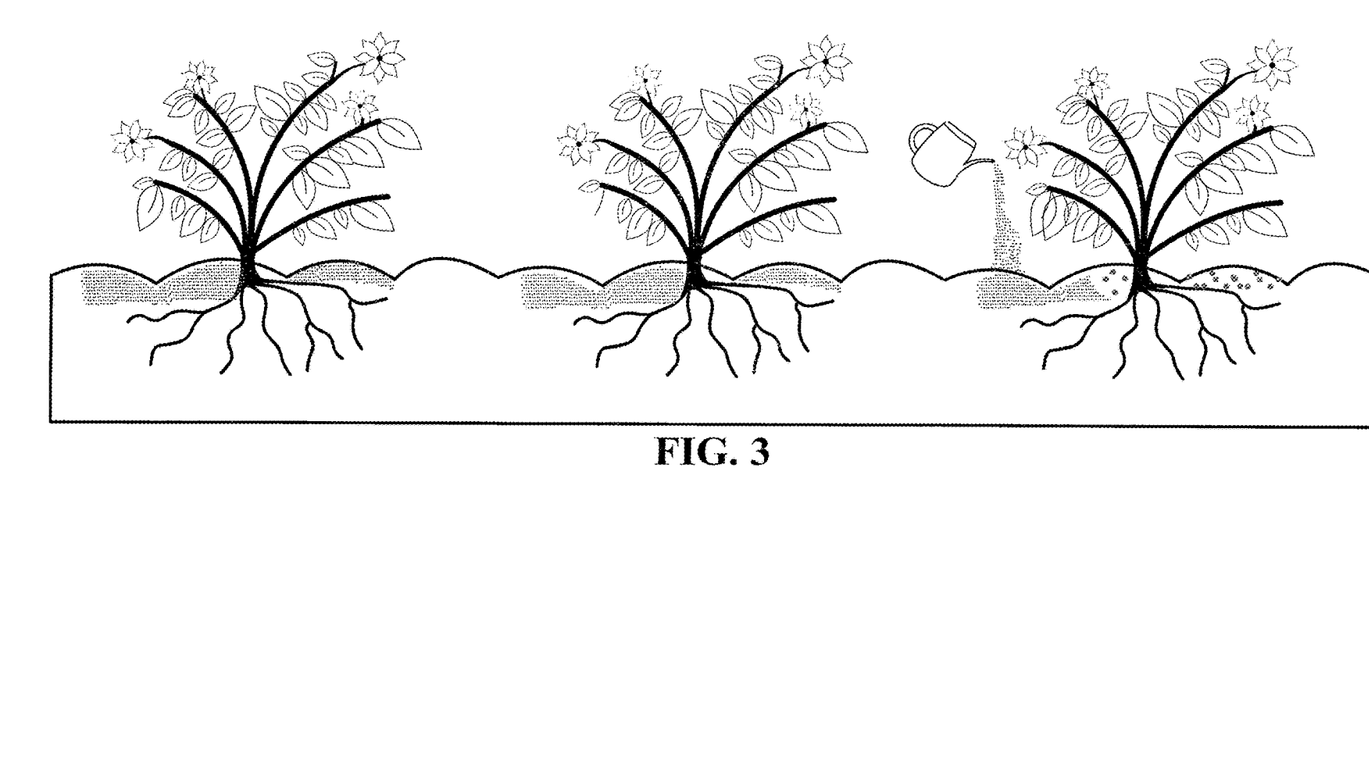
FIG. 3 is the view of FIG. 2, but showing all three plants receiving the same amount of watering, which is enough so that the powder plant food composition that had been applied to the one plant is no longer readily visible on top of the soil.
Figure 4:
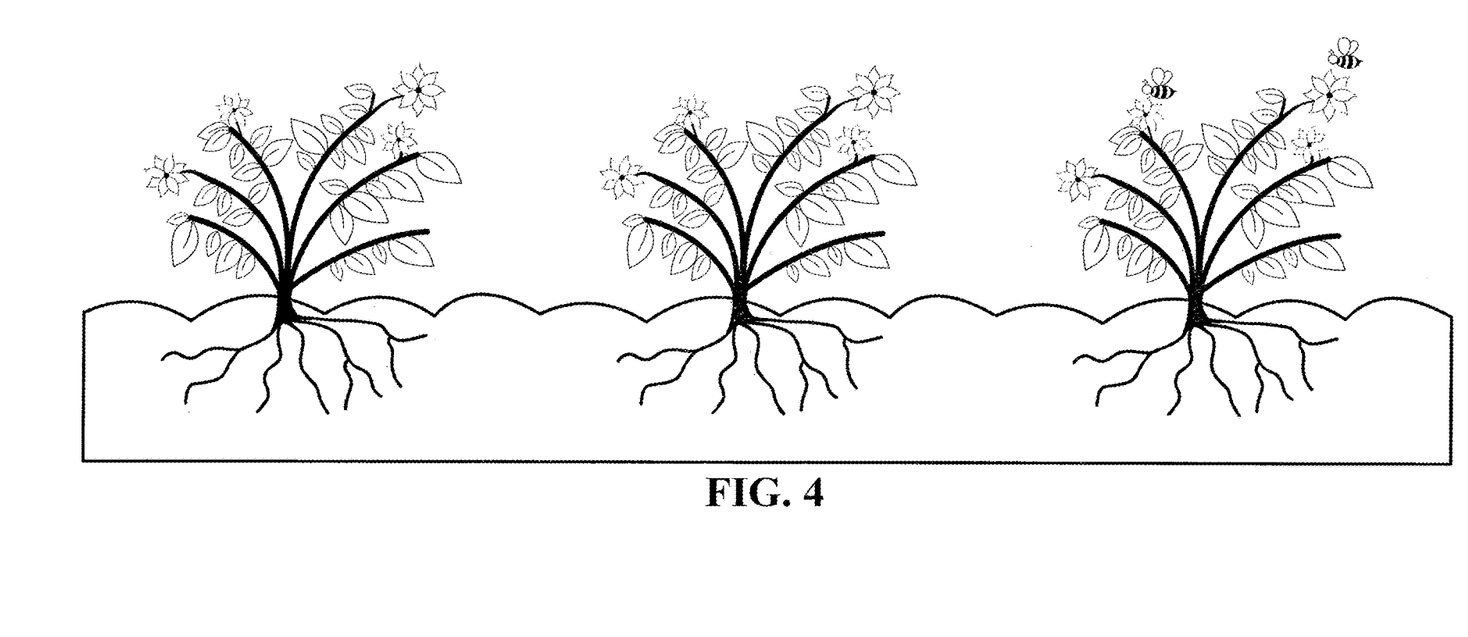
FIG. 4 illustrates the row of plants as shown in FIGS. 2-3, but is shown one day later, with the one plant that was previously treated having attracted bees, while the untreated blooms of the other two plants have not attracted any bees, based on actual test results conducted by the inventor.

Some actual tests results from use of the formula are illustrated in FIGS. 2-4. FIG. 2 shows a row of flowering plants, onto one of which is applied the plant food composition disclosed herein. FIG. 3 shows all three plants being watered the same amount, which is sufficient so that the powder mixture is no longer visible on the soil beneath the plant that received the composition, as shown in FIG. 4. All three plants were co-located, and thus received the same amount of sunlight, so as not to skew the results. FIG. 4 illustrates the row of plants as shown in FIGS. 2-3, one day later, with the blooms of the plant that was previously treated having been observed with bees interacting for a sustained period of time with its blossoms, while the untreated blooms of the other plants have not attracted any bees, based on actual test results conducted by the inventor.

The plant food thus treated includes supplements to meet the nutritional requirements of the pollinator population, by enhancing the plant food mixture by adding the following to the mixture:

at least one component which is a source of carbohydrates in the range of 40% to 60% by weight;

at least one component which is a fat source of lipids in the range of 2% to 6% by weight;

at least one component which is a source of protein with complete amino acids in the range of 40% to 60% by weight;

at least one component which is a source of vitamins and minerals in the range of 1% to 2% by weight; and the components being compatible with the physical properties of carbohydrates, vitamins and minerals and any other active ingredients, the method of application and environmental factors which include:

soil type, moisture and temperature, organic matter, soil structure, and, current nutrient levels, as well known to those in the chemical and agricultural arts.

The aforementioned method can be provided in which the carbohydrates component is arrowroot starch or one selected from the group consisting of oats, amaranth, buckwheat, chia, millet, and/or quinoa, or are selected from the group consisting of tapioca starch, potato starch, maltodextrin and dextrose, or combinations thereof.

The aforementioned method is provided in which the lipid/fat source component is medium-chain triglycerides or one selected from the group consisting of soy phosphoglycolipids, fructose-oligosaccharides, or sunflower lecithin, polyglycerol, esters of fatty acids, mono and diglycerides, and palm oil, or combinations thereof.

The aforementioned method can be provided in which the protein component is selected from the group consisting of pea protein, rice protein, cranberry, sacha inchi, acai, blackberry, blueberry, broccoli, coconut milk, sunchoke inulin, pomegranate, strawberry, turmeric or dried coconut nectar, dried pineapple, monk fruit, fermented yellow pea seed protein, fermented brown rice seed protein, fermented hemp seed, fermented pumpkin, fermented flax seed, fermented mung bean, fermented spirulina or pea protein, sprouted brown rice protein, amaranth sprout, buckwheat sprout, millet sprout, cracked wall chlorella, quinoa sprout, chia seed sprout, garbanzo bean sprout, lentil sprout, adzuki bean sprout, flax seed sprout, sunflower seed sprout, pumpkin seed sprout, sesame seed sprout, navy beans, almonds, black beans and sweet corn powder, or combinations thereof.

The aforementioned method is also provided in which the plant protein may also be selected from the group consisting of albumins, globulins, prolamins and glutelins, or combinations thereof.

The aforementioned method can be also provided in which the source of vitamins and minerals are selected from the group consisting of vitamin A, vitamin C, vitamin D, vitamin E, vitamin K, thiamine, riboflavin, niacin, vitamin B6, folate, vitamin B12, biotin, pantothenic acid, choline, iodine, magnesium, zinc, selenium, copper, manganese, chromium, molybdenum, vitamin D3, calcium, iron, phosphorus, boron, myo-inositol, silicon, quercetin, coenzyme Q10, grape seed, N-acetyl L-cysteine, glutathione, boron or combinations thereof.

The aforementioned method can be also provided in which the plant food mixture is adapted to be infused through the roots and vascular phloem of a selected plant, whereby supplement enhanced pollen and nectar of the selected plant ingested by a pollinator insect will pollinate and further pollinator population in the natural gardens of the enhanced plants.

The aforementioned method can also be provided in which the pollinator population includes bees, butterflies or other insect pollinators, whose population will be enhanced by the plant food mixture.

The aforementioned method is also provided including the step of adapting the plant food mixture to be infused through the roots and vascular phloem of a selected plant, whereby supplement enhanced pollen and nectar of the selected plant ingested by a pollinator insect will pollinate and further pollinator population in the natural gardens of the enhanced plants, thereby enhancing the population of bees, butterflies, insects or other pollinators.

Although the present invention has been disclosed in terms of preferred embodiments, it is further known that other modifications may be made to the present invention, without departing from the spirit and scope of the invention.

While illustrative implementations of one or more embodiments of the disclosed system are provided hereinabove, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

The invention claimed is:

1. A plant food composition providing nutrition to plants that are attracted by pollinators said composition comprising:
   at least one component which is comprised of at least one carbohydrate present in said composition in the range of about 40% to about 60% by weight;
   at least one component which is comprised of at least one lipid present in said composition in the range of about 2% to about 6% by weight;
   at least one component which is comprised of at least one protein present in said composition in the range of about 40% to about 60% by weight; and
   at least one component which is comprised of one or more vitamins and minerals in the range of about 1% to about 2% by weight based on the total weight of plant food composition, and wherein the carbohydrate is selected from the group consisting of arrowroot starch or oats, amaranth, buckwheat, chia, millet, oat, quinoa, tapioca starch, potato starch, maltodextrin and dextrose, or combinations thereof.

2. The plant food composition of claim 1 in which the lipid component is medium-chain triglycerides, soy phosphoglycolipids, fructose-oligosaccharides, sunflower lecithin, polyglycerol, esters of fatty acids, mono and diglycerides, and palm oil, or combinations thereof.

3. The plant food composition of claim 2 in which said protein component is selected from the group consisting of pea protein, rice protein, cranberry, sacha inchi, acai, blackberry, blueberry, broccoli, coconut milk, sunchoke inulin, kale, pomegranate, strawberry, turmeric, dried coconut nectar, dried pineapple, monk fruit, fermented yellow pea seed protein, fermented brown rice seed protein, fermented hemp seed, fermented pumpkin, fermented flax seed, fermented mung bean, fermented spirulina, pea protein, sprouted brown rice protein, amaranth sprout, buckwheat sprout, millet sprout, cracked wall chlorella, quinoa sprout, chia seed sprout, garbanzo bean sprout, lentil sprout, adzuki bean sprout, flax seed sprout, sunflower seed sprout, pumpkin seed sprout, sesame seed sprout, navy beans, almonds, black beans and sweet corn powder, albumins, globulins, prolamins and glutelins, or combinations thereof.

4. The plant food composition of claim 2 in which sources of the vitamins and minerals are selected from the group consisting of vitamin A, vitamin C, vitamin D, vitamin E, vitamin K, thiamine, riboflavin, niacin, vitamin B6, folate, vitamin B12, biotin, pantothenic acid, choline, iodine, magnesium, zinc, selenium, copper, manganese, chromium, molybdenum, vitamin D3, calcium, iron, phosphorus, boron, myo-inositol, silicon, quercetin, coenzyme Q10, grape seed, N-acetyl L-cysteine, glutathione, boron or combinations thereof.

5. The plant food composition of claim 4 in which the pollinators are selected from the group consisting of bees, butterflies and other pollinator insects.

6. The plant food composition of claim 4 in which said plant food composition is adapted to be infused through the roots and vascular phloem of a selected plant, whereby the supplement enhances pollen and nectar production of said selected plant and wherein said nectar or pollen is ingested by a bee or other pollinator insect that will pollinate and further increase the pollinator population in the natural gardens of the plants.

7. The plant food composition of claim 6 wherein said plant food composition is provided to the plant via liquid spraying, by absorption from the plant's growing media from granular, powder of liquid, by foliar, root and/or trunk injection and/or use of compacted solid spikes.

8. The plant food composition of claim 1 comprising said carbohydrates being provided at about 50% by weight, said lipids being provided at about 4% by weight, said protein being provided at about 46% by weight and said vitamins and minerals being provided at less than about 1% by weight.

9. A plant food composition configured to be applied to a plant bloom or surrounding soil to enhance its pollen and nectar production to thereby attract and enhance the nutritional intake of bees and other pollinators to further increase the pollinator population, said plant food composition consisting essentially of:
   retinyl palmitate, being present in said composition in an amount of about 0.03 percent by weight;
   vitamin C, being present in said composition in an amount of about 12.6 percent by weight;
   cholecalciferol, being present in said composition in an amount of about 0.001 percent by weight;
   D-Alpha tocopheryl succinate, being present in said composition in an amount of about 2.1 percent by weight;
   phytonadione, being present in said composition in an amount of about 0.004 percent by weight;
   thiamine hydrochloride, being present in said composition in an amount of about 1.4 percent by weight;
   riboflavin-5-phosphate sodium, being present in said composition in an amount of about 1.4 percent by weight;
   niacinamide, being present in said composition in an amount of about 2.8 percent by weight;
   pyridoxal-5 phosphate, being present in said composition in an amount of about 2.8 percent by weight;
   L-5-methyltetrahydrofolate calcium, being present in said composition in an amount of 0.06 percent by weight;
   methylcobalamin, being present in said composition in an amount of about 0.03 percent by weight;
   biotin, being present in said composition in an amount of about 0.04 percent by weight;
   calcium-D-pantothenate, being present in said composition in an amount of about 2.1 percent by weight;
   choline bitartrate, being present in said composition in an amount of about 7.0 percent by weight;
   potassium iodide, being present in said composition in an amount of about 0.01 percent by weight;

magnesium, being present in said composition in an amount of about 2.8 percent by weight;

zinc bisglycinate chelate, being present in said composition in an amount of about 1.0 percent by weight;

L-selenium, being present in said composition in an amount of about 0.004 percent by weight;

copper bisglycinate chelate, being present in said composition in an amount of about 0.14 percent by weight;

manganese bisglycinate chelate, being present in said composition in an amount of about 0.07 percent by weight;

chromium nicotinate glycinate chelate, being present in said composition in an amount of about 0.005 percent by weight;

molybdenum glycinate chelate, being present in said composition in an amount of about 0.01 percent by weight;

gotu kola herb extract, being present in said composition in an amount of about 0.17 percent by weight;

bacopa leaf extract, being present in said composition in an amount of about 14 percent by weight;

pycnogenol maritime pine bark extract, being present in said composition in an amount of about 7.0 percent by weight; and bioperine black pepper fruit extract, being present in said composition in an amount of at least about 0.70 percent by weight based on the total weight of the composition.

10. The plant food composition as in claim 9 further comprising: a polyphenol whole food blend, being present in said composition in an amount of about 25 percent by weight based on the total weight of the composition.

11. The plant food composition as in claim 10 wherein said polyphenol whole food blend comprises: apple fruit powder, blueberry fruit powder, blackberry fruit powder, peach fruit powder, apricot fruit powder, raspberry fruit powder, cranberry fruit powder, strawberry fruit powder, european elder fruit powder, barberry fruit powder, cherry fruit powder, green tea lead extract, broccoli head plant powder, spinach leaf powder, collards leaf powder, pumpkin seed powder, sweet potato root powder, sunflower seed powder, organic kelp powder, chlorella cracked cell wall powder, maitake mushroom fruiting body powder, and shitake mushroom powder, in equal parts.

* * * * *